United States Patent
Derby, V et al.

(10) Patent No.: US 7,275,615 B2
(45) Date of Patent: Oct. 2, 2007

(54) SPEED CONTROL SYSTEM FOR WALK BEHIND POWERED EQUIPMENT

(75) Inventors: Harry L. Derby, V, Charlotte, NC (US); Bryan E. Holby, Charlotte, NC (US)

(73) Assignee: Textron Inc., Providence, RI (US)

( * ) Notice: Subject to any disclaimer, the term of this patent is extended or adjusted under 35 U.S.C. 154(b) by 375 days.

(21) Appl. No.: 10/851,988

(22) Filed: May 21, 2004

(65) Prior Publication Data

US 2005/0257509 A1 Nov. 24, 2005

(51) Int. Cl.
*B60K 26/00* (2006.01)

(52) U.S. Cl. ............... 180/333; 180/334; 180/19.3; 56/10.8

(58) Field of Classification Search ............... 56/10.5, 56/10.8, 11.3, 11.6; 180/315, 334, 332, 336, 180/19.1, 335, 19.2, 19.3, 364
See application file for complete search history.

(56) References Cited

U.S. PATENT DOCUMENTS

| | | | |
|---|---|---|---|
| 4,213,288 A * | 7/1980 | Takeuchi et al. ............... 56/11.6 |
| 4,558,558 A | 12/1985 | Horner, Jr. et al. | |
| 4,726,178 A | 2/1988 | Mallaney et al. | |
| 4,924,663 A | 5/1990 | Ehn, Jr. et al. | |
| 5,155,985 A * | 10/1992 | Oshima et al. ............... 56/10.8 |
| 5,297,379 A * | 3/1994 | Smith ............... 56/11.8 |
| 5,343,678 A * | 9/1994 | Stuart ............... 56/11.3 |
| 5,822,965 A | 10/1998 | Chesack et al. | |
| 6,109,009 A | 8/2000 | Benson | |
| 6,339,916 B1 | 1/2002 | Benson | |
| 6,347,502 B1 | 2/2002 | DeVries | |
| 6,523,334 B1 | 2/2003 | Dettmann | |
| 6,698,171 B2 | 3/2004 | Doerflinger | |
| 2003/0084655 A1 | 5/2003 | Rush et al. | |

FOREIGN PATENT DOCUMENTS

DE 19601694 A1 * 7/1997
FR 2631206 11/1989

* cited by examiner

*Primary Examiner*—Paul N. Dickson
*Assistant Examiner*—Tiffany L. Webb
(74) *Attorney, Agent, or Firm*—Harness, Dickey & Pierce, P.L.C.

(57) ABSTRACT

A walk-behind self-propelled apparatus having a mobile structure and a handle assembly coupled to the mobile structure. The handle assembly includes a pair of grip portions. A ground engaging traction member is rotatably coupled to the mobile structure and imparts traction movement to the mobile structure for movement on the ground. A power source outputs drive power and a drive system, coupled between the power source and the ground engaging traction member, selectively transmits the drive power to the ground engaging traction member. A speed control actuation system is then coupled to the drive system and includes a control member pivotable about an axis. The axis is generally parallel to a plane extending between the pair of grip portions of the handle assembly to permit an operator to operate the control member merely through thumb actuation without removing their hands from the pair of grip portions.

18 Claims, 3 Drawing Sheets

SPEED CONTROL SYSTEM FOR WALK BEHIND POWERED EQUIPMENT

FIELD OF THE INVENTION

The present invention relates to powered equipment and, more particularly, relates to a speed control system for walk behind powered equipment that provides improved ergonomics, functionality, and safety.

BACKGROUND OF THE INVENTION

As is known in the art, self propelled powered equipment is often used in a wide variety of applications, such as lawn mowers, greens mowers, roto-tillers, aerators, snowblowers, and the like. Self propelled powered equipment typically includes an engine, either an internal combustion engine and/or electric motor, that is used to power a drive system. These drive systems traditionally include a friction device or gear train that transmits motive power from the engine to at least one drive wheel or roller. The drive system may be actuated in response to any one of a number of operator inputs, including gear shifters, levers, and the like. However, often these operator input systems are used to translate a cable coupled to the drive system to position the drive system in any one of a number of desired motive configurations.

However, recently there has been an interest in improving the operation of these operator input systems. That is, there has been a need to improve the operation, reliability, durability, and safety thereof. Additionally, there exists a need in the relevant art to improve these input systems to simplify their operation and provide improved control. Additionally, there is a need in the relevant art to provide a speed control system that overcomes the disadvantages of the prior art.

SUMMARY OF THE INVENTION

According to the principles of the present invention, a walk-behind self-propelled apparatus having an advantageous construction is provided. The walk-behind self-propelled apparatus includes a mobile structure and a handle assembly coupled to the mobile structure. The handle assembly includes a pair of grip portions. A ground engaging traction member is rotatably coupled to the mobile structure and imparts traction movement to the mobile structure for movement on the ground. A power source outputs drive power and a drive system, coupled between the power source and the ground engaging traction member, selectively transmits the drive power to the ground engaging traction member. A speed control actuation system is then coupled to the drive system and includes a control member pivotable about an axis. The axis is generally parallel to a plane extending between the pair of grip portions of the handle assembly to permit an operator to operate the control member merely through thumb actuation without removing their hands from the pair of grip portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. For example, the present invention may find utility in a wide variety of applications, including use in lawn mowers, greens mowers, roto-tillers, aerators, snowblowers, and the like. However, in the following description, the present invention will be described in connection with a greens mower. Such description should not be regarded as limiting the present invention.

Figure 1:
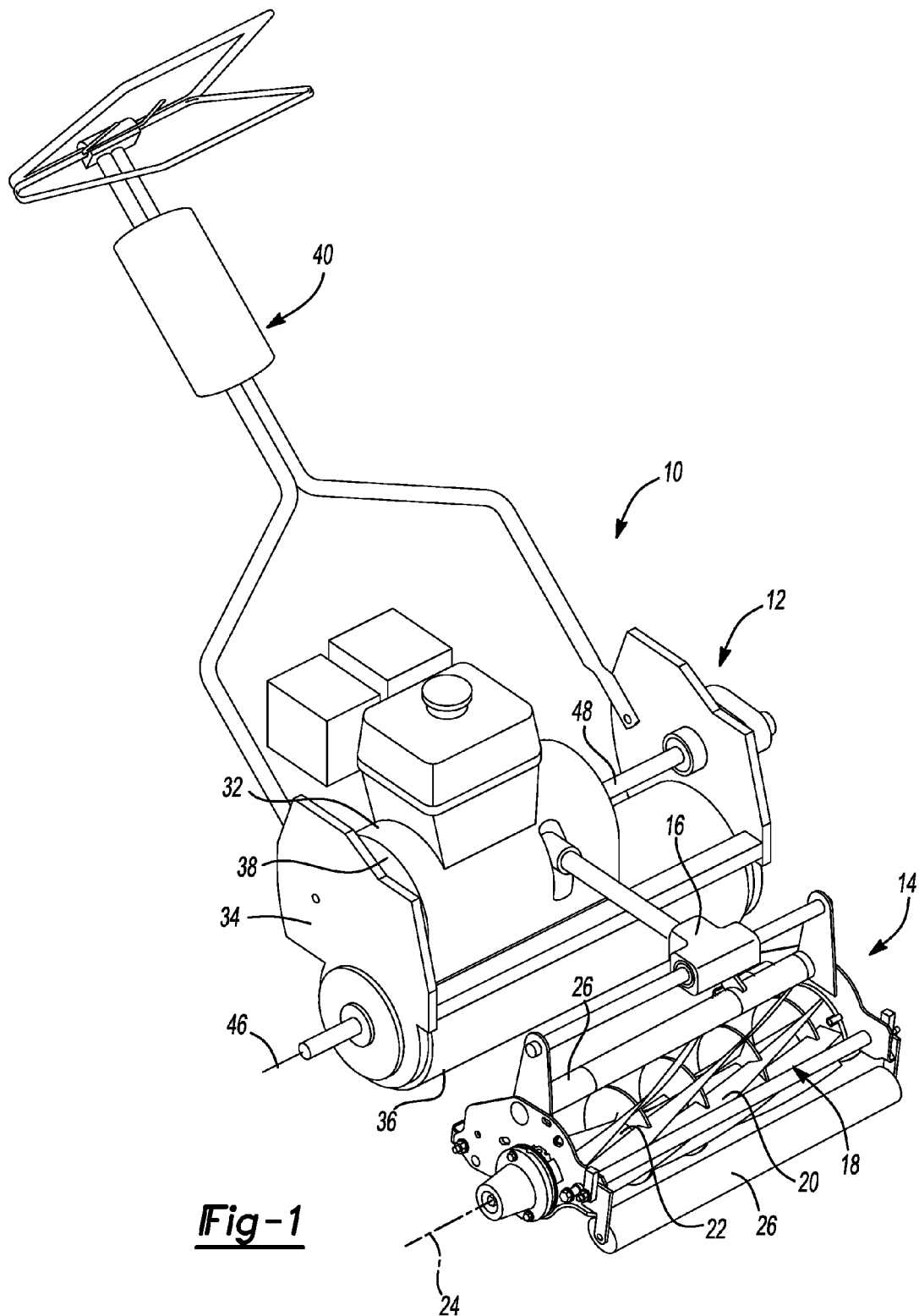
FIG. 1 is a perspective view illustrating a greens mower according to the principles of the present invention.

With reference to the figure, FIG. 1 illustrates a greens mower 10 incorporating the principles of the present invention. Greens mower 10 is a reel-type mower having a base portion 12 and a floating or articulating mowing unit 14. Mowing unit 14 is articulately coupled to base portion 12 through a pivoting mechanism 16.

Mowing unit 14 includes a rotatable greens mower reel 18 having spiraled blades 20 equally spaced around a reel shaft 22. Reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 rotatably mounted along a forward and rearward portion of mowing unit 14. The pair of ground engaging rollers 26 serve to support mowing unit 14 for movement on the ground. The pair of ground engaging rollers 26 are preferably adjustable to define a cutting height.

Base portion 12 generally includes an internal combustion engine or electric motor 32, a frame 34, a lawn roller 36, a drive system 38, and a handle assembly 40. Internal combustion engine or electric motor 32 is of conventional design and is mounted on frame 34. Internal combustion engine or electric motor 32 may include an electric starter for improved convenience.

Lawn roller 36 is rotatably mounted to frame 34 through a roller axle 46. Lawn roller 36 supports base portion 12 on the ground and serves as the traction drive for greens mower 10. Other ground-supporting traction members could be substituted. Drive system 38 is operably coupled between an output shaft 48 and lawn roller 36. Drive system 38 generally includes a drive pulley (not shown) mounted to output shaft 48 for rotation therewith and an idler pulley (not shown) mounted to lawn roller 36 for rotation therewith. A drive belt (not shown) extends between the drive pulley and the idler pulley to transfer drive force from internal combustion engine or electric motor 32 to lawn roller 36. Thus, there exists a traction drive train from internal combustion engine 32 to the ground-engaging lawn roller 36 capable of driving greens mower 10 in at least a forward direction.

Figure 2:
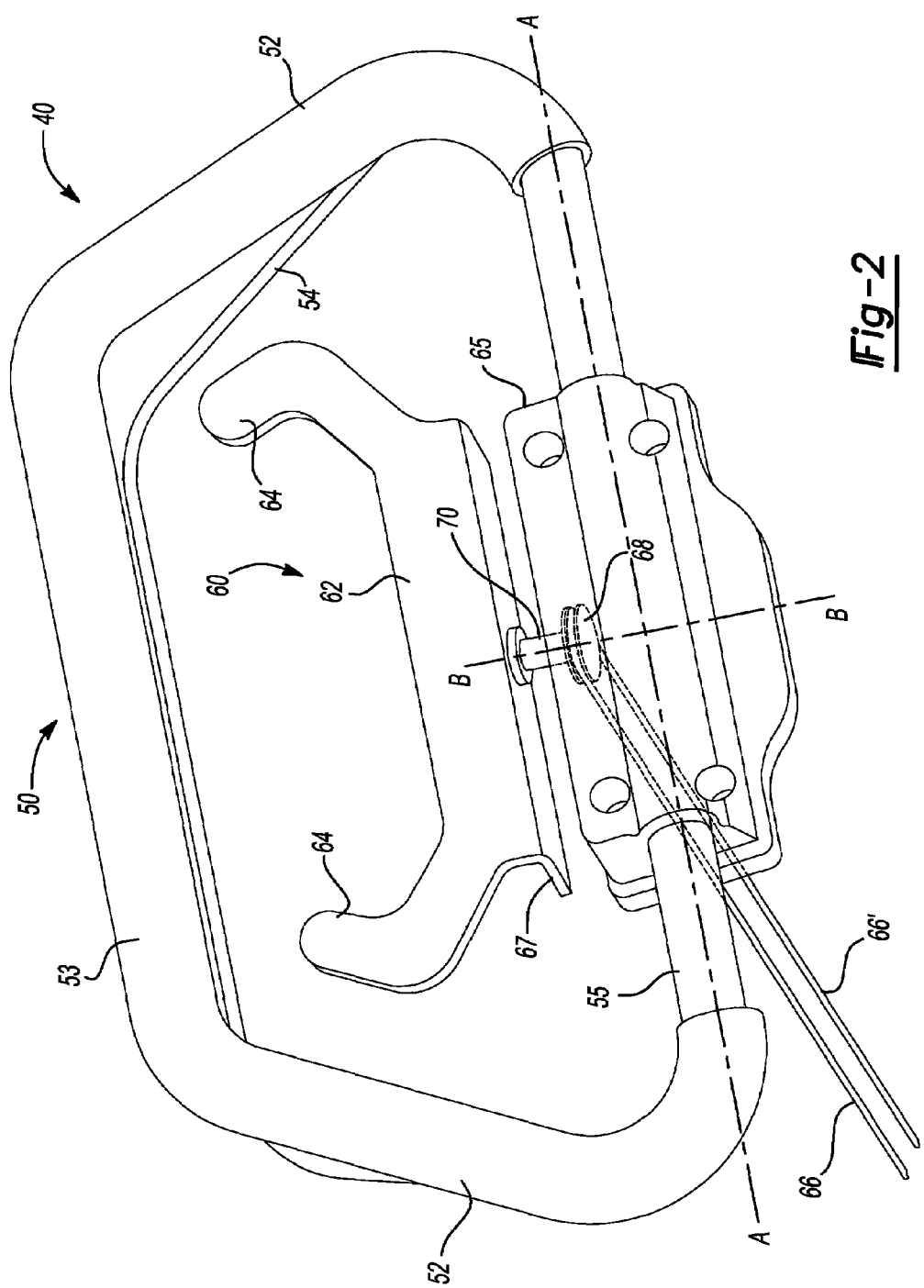
FIG. 2 is an enlarged perspective view of the speed control actuation system according to the principles of the present invention.

As best seen in FIG. 2, handle assembly 40 includes a handle 50 suitably connected with frame 34. Handle 50 includes a grip portion 52 which the operator can hold in steering greens mower 10. A top portion 53 interconnects distal ends of grip portions 52 and a bottom portion 55 interconnects proximal ends of grip portions 52. Bottom portion 55 of handle 50 defines a longitudinal axis A-A.

A movably mounted bail or operator hand control 54 may be pivotally connected to handle 50 and may be movable toward and away from the grip portion 52. The operation of hand control 54 may be similar to that disclosed in commonly owned U.S. Pat. No. 6,523,334, which is incorporated herein by reference. In this arrangement, the operator can hold both handle 50 and hand control 54 while guiding greens mower 10. Upon release of hand control 54, traction drive system 38 is interrupted in a manner similar to that disclosed in the '334 Patent.

Additionally, handle assembly 40 includes a speed control actuation system 60 operable to provide a control input to actuation traction drive system 38. Specifically, speed control actuation system 60 includes a paddle member 62 pivotally coupled to handle assembly 40. More particularly, paddle member 62 is generally planar in construction and generally U-shaped having a pair of upwardly projecting end portions 64. End portions 64 are disposed within thumb reach of grip portion 52 of handle 50 such that an operator may actuation paddle member 62 without removal of their hands from grip portion 52, as will be described below.

Still referring to FIG. 2, paddle member 62 is pivotally mounted to a base portion 65 of handle 50 for rotation about an axis B-B. Axis B-B is generally oriented normal to axis A-A. In other words, axis B-B is generally parallel to a plane extending through grip portions 52, top portion 53, and bottom portion 55 of handle 50. In this regard, paddle member 62 is pivotable in either direction about axis B-B by the simple application of thumb pressure from the operator. Paddle member 62 includes a generally turned flange 67 to permit the coupling of paddle member 62 to a shaft 70.

Figure 3:
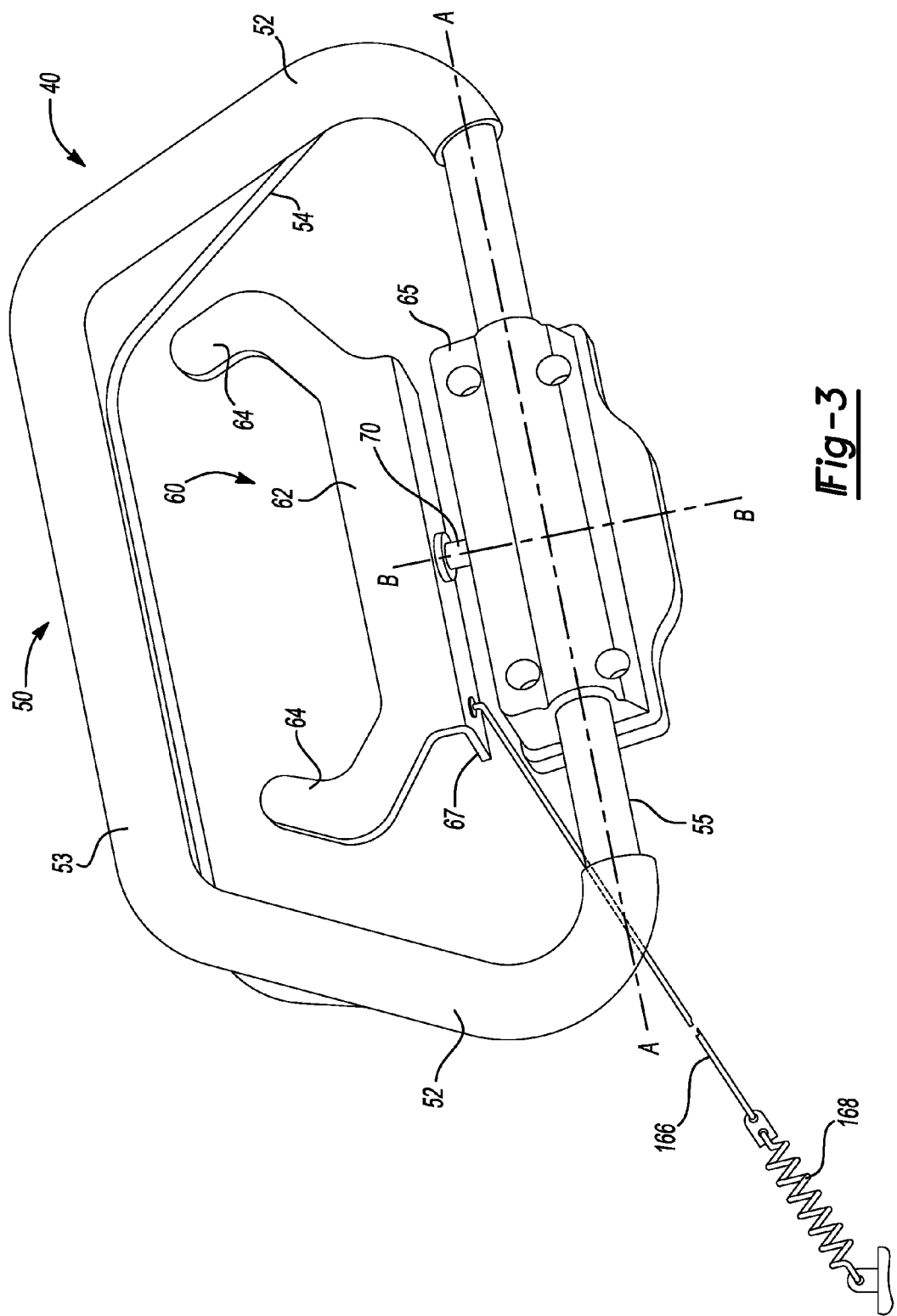
FIG. 3 is an enlarged perspective view of a further embodiment of the speed control actuation system according to the principles of the present invention.

Paddle member 62 is operably coupled to a cable member 66 extending to traction drive system 38. Cable member 66 transfers a control force to traction drive system 38, thereby providing at least a forward propulsion command and, optionally, a rearward propulsion command in a convention manner. According to a first embodiment as seen in FIG. 2, cable member 66 is disposed about a pulley 68. Pulley 68 is contained within base portion 66 of handle 50 and is fixed for rotation with a shaft 70 downwardly extending from paddle member 62 through axis B-B. A return cable member 66' may be used to provide a fore and aft control movement or, alternatively, cable member 66 may be spring biased in a direction opposing paddle member 62. According to an alternative embodiment as seen in FIG. 3, a cable member 166 is operably coupled to paddle member 62 through conventional means, including fasteners, a physical relief formed in paddle member 62 that cooperates with an oversized section of cable member 166, or other systems. Cable member 166 is biased in tension via a spring member 168. In this regard, as paddle member 62 is actuated, force is applied to cable member 166 against the biasing force of spring member 168 to provide a commanded drive operation to traction drive system 38. Upon release of the pressure on paddle member 62, spring member 168 returns cable member 166 and paddle member 62 to a neutral position.

During operation, an operator can apply a controlling pressure with their thumb to one of the pair of upwardly projecting end portions 64 of paddle member 62 without removing their hand from grip portion 52 to command a desired drive movement, such as to increase travel speed. Such pressure causes paddle member 62 to rotate about shaft 70 (axis B-B) in a first direction, thereby rotating pulley 68 and applying a retracting force along cable member 66, thereby actuating traction drive system 38 in a convention manner. Alternatively, such pressure against paddle member 62 in the first direction, applies a retracting force to cable member 166, thereby actuating traction drive system 38. To decrease travel speed or engine a reverse drive gear of traction drive system 38, the operator then applies a controlling pressure with their thumb to the opposite upwardly projecting end portion 64 of paddle member 62 without removing their hand from grip portion 52. Such opposing control input causes paddle member 62 to rotate about shaft 70 (axis B-B) in a second direction opposite of the first direction, thereby rotating pulley 68 and apply either an opposing retracting force along return cable member 66' or simply permitting the biasing force in cable member 66 to retract cable member 66, or similarly permitting the biasing force of spring member 168 to retract cable member 166. This motion then commands either a slow drive movement and/or a reverse drive movement.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A walk-behind self-propelled apparatus comprising:
   a mobile structure;
   a handle assembly coupled to said mobile structure, said handle assembly having a pair of grip portions; a ground engaging traction member rotatably coupled to said mobile structure, said ground engaging traction member imparting traction movement to said mobile structure for movement on the ground;
   a power source outputting drive power;
   a drive system operably coupled between said power source and said ground engaging traction member, said drive system selectively transmitting said drive power to said ground engaging traction member; and
   a speed control actuation system operably coupled to said drive system, said speed control actuation system having a control member pivotable about an axis by thumbs of an operator without removal of hands of the operator from said pair of grip portions, said axis being generally parallel to a plane extending between said pair of grip portions of said handle assembly;
   wherein said control member of said speed control actuation system is coupled to a shaft extending through said handle assembly, said speed control actuation system further including a pulley member fixed for rotation with said shaft, said pulley member engaging said drive system to provide control input to said drive system in response to actuation of said control member by an operator.

2. The walk-behind self-propelled apparatus according to claim 1 wherein said control member is generally U-shaped having a pair of end portions, each of said pair of end portions being disposed generally adjacent a corresponding one of said pair of grip portions to permit actuation of said control member by an operator without said user operator releasing said pair of grip portions.

3. The walk-behind self-propelled apparatus according to claim 1 wherein said control member of said speed control actuation system is coupled to a shaft extending through said handle assembly, said speed control actuation system further including a cable member operably coupled between said control member and said drive system to provide control input to said drive system in response to actuation of said control member by an operator.

4. The walk-behind self-propelled apparatus of claim 1 wherein said control member is offset inboard of said grip portions.

5. The walk-behind self-propelled apparatus of claim 1 wherein said control member is precluded from rotating in a direction along said axis.

6. A walk-behind self-propelled apparatus comprising:
a mobile structure;
a handle assembly coupled to said mobile structure, said handle assembly having a pair of grip portions;
a ground engaging traction member rotatably coupled to said mobile structure, said ground engaging traction member imparting traction movement to said mobile structure for movement on the ground;
a power source outputting drive power;
a drive system operably coupled between said power source and said ground engaging traction member, said drive system selectively transmitting said drive power to said ground engaging traction member in response to a drive command signal; and
a speed control actuation system operably coupled to said drive system to provide said drive command signal, said speed control actuation system having a control member rotatable about an axis in a first direction to output said drive command signal to increase drive speed and in a second direction to output said drive command signal to decrease drive speed, said control member being displaceable only about said axis, said axis being generally parallel to a plane extending between said pair of grip portions of said handle assembly.

7. The walk-behind self-propelled apparatus according to claim 6 wherein said control member is generally U-shaped having a pair of end portions, each of said pair of end portions being disposed generally adjacent a corresponding one of said pair of grip portions to permit actuation of said control member by an operator without said user operator releasing said pair of grip portions.

8. The walk-behind self-propelled apparatus according to claim 6 wherein said control member of said speed control actuation system is coupled to a shaft extending through said handle assembly, said speed control actuation system further including a pulley member fixed for rotation with said shaft, said pulley member engaging said drive system to provide control input to said drive system in response to actuation of said control member by an operator.

9. The walk-behind self-propelled apparatus according to claim 6 wherein said control member of said speed control actuation system is coupled to a shaft extending through said handle assembly, said speed control actuation system further including a cable member operably coupled between said control member and said drive system to provide control input to said drive system in response to actuation of said control member by an operator.

10. The walk-behind self-propelled apparatus of claim 6 wherein said control member is offset inboard of said grip portions.

11. The walk-behind self-propelled apparatus of claim 6 wherein said handle assembly further includes a top portion offset above said control member.

12. A walk-behind self-propelled apparatus comprising:
a mobile structure;
a handle assembly coupled to said mobile structure, said handle assembly having a pair of grip portions;
a ground engaging traction member rotatably coupled to said mobile structure, said ground engaging traction member imparting traction movement to said mobile structure for movement on the ground;
a power source outputting drive power;
a drive system operably coupled between said power source and said ground engaging traction member, said drive system selectively transmitting said drive power to said ground engaging traction member; and
a speed control actuation system operably coupled to said drive system, said speed control actuation system having a control member offset inboard of said grip portions and pivotable about an axis by thumbs of an operator without removal of hands of the operator from said pair of grip portions;
wherein said axis is generally perpendicular to a line extending through said grip portions.

13. The apparatus of claim 12 wherein said axis is generally parallel to a plane extending between said pair of grip portions of said handle assembly.

14. The apparatus of claim 12 wherein said control member is generally U-shaped having a pair of end portions, each of said pair of end portions being disposed generally adjacent a corresponding one of said pair of grip portions to permit actuation of said control member by an operator without said operator releasing said pair of grip portions.

15. The apparatus of claim 12 wherein said control member of said speed control actuation system is coupled to a shaft extending through said handle assembly, said speed control actuation system further including a pulley member fixed for rotation with said shaft, said pulley member engaging said drive system to provide control input to said drive system in response to actuation of said control member by an operator.

16. The apparatus of claim 12 wherein said control member of said speed control actuation system is coupled to a shaft extending through said handle assembly, said speed control actuation system further including a cable member operably coupled between said control member and said drive system to provide control input to said drive system in response to actuation of said control member by an operator.

17. The apparatus of claim 12 wherein said handle assembly further includes a top portion offset above said control member.

18. The apparatus of claim 12 wherein said control member is precluded from rotating in a direction along said axis.

* * * * *